United States Patent [19]

Mee

[11] 4,127,964
[45] Dec. 5, 1978

[54] MUSHROOM COMPOSTING

[75] Inventor: Henry M. Mee, Castro Valley, Calif.

[73] Assignee: The Kinoko Company, Oakland, Calif.

[21] Appl. No.: 739,392

[22] Filed: Nov. 8, 1976

[51] Int. Cl.$^2$ .............................................. A01G 1/04
[52] U.S. Cl. ........................................... 47/1.1; 71/5; 71/24; 71/63
[58] Field of Search ...................... 47/1.1; 71/5, 9, 10, 71/8, 11, 21, 23, 24, 63

[56] References Cited

U.S. PATENT DOCUMENTS

| | | | |
|---|---|---|---|
| 2,005,365 | 6/1935 | Di Giacinto | 71/23 X |
| 2,035,286 | 3/1936 | Wenzel | 71/21 X |
| 3,165,394 | 1/1965 | Rausing | 71/21 X |
| 3,828,470 | 8/1974 | Stoller | 71/5 X |

FOREIGN PATENT DOCUMENTS 2151326  4/1973  Fed. Rep. of Germany ............. 47/1.1

OTHER PUBLICATIONS

Chem. Abstracts, vol. 86, #15, Abstract 105004h Grabbe, Mushroom Sci., 1974.
Principles & Practice of Mushroom Culture, Stoller from Economic Botany, vol. 8, #1, Jan.–Mar. 1954, pp. 56–58.

Primary Examiner—Ferris H. Lander
Attorney, Agent, or Firm—Townsend and Townsend

[57] ABSTRACT

Composting compositions are provided which avoid conventional composting for production of mushrooms requiring casing. A mixture of steer manure and peat moss in combination with a small amount of an agent for maintaining permeability is mixed with water and sterilized. The resulting product provides excellent composting for mushrooms requiring casing, with rapid production and high yield.

5 Claims, No Drawings

MUSHROOM COMPOSTING

BACKGROUND OF THE INVENTION

1. Field of the Invention

There are continuing efforts to improve methods of production and yield of mushrooms. Mushrooms are a desirable source of human food, being high in protein and normally growing on waste materials. One group of mushrooms which is grown commercially, normally employs a hot manure and its bedding mixture as a substrate and after the substrate has been properly composted outdoor and indoor and then it is inoculated with spawn and the mycelium established, a layer of soil is placed over the substrate which is referred to as a casing.

The most common mushroom which is grown commercially in this manner is the *Agaricus bisporus*, commonly referred to as the common button mushroom. A vast literature exists on the manner in which this mushroom and comparable mushrooms may be cultivated. Nevertheless, there is continuing interest in developing new composting which provides simpler methods for preparing composting and improved mushroom growth.

DESCRIPTION FROM THE PRIOR ART

Texts of interest are Singer, *Mushrooms and Truffles*, Interscience Publishers, Inc., New York (1961) and Gray, *The Use of Fungi as Food and in Food Processing*, CRC Press, Cleveland, Ohio (1970). United States patents of interest include U.S. Pat. Nos. 1,832,593; 1,833,089; 2,005,365; 2,677,917; 2,761,246; and 3,560,190. Foreign patents of interest include UK Patent No. 462,316; French Patent No. 1,445,649 and Japanese Patent Nos. 8756/64; 16050/70; 27768/70; 28527/70; 28532/70; 37047/70; 25682/71; 22768/72; 42660/72; and 3334/74;

SUMMARY OF THE INVENTION

A novel composting composition is provided for growing mushrooms requiring casing which comprises a combination of a cold manure and a naturally occurring humic acid containing cooloidal material, with a small amount of an inorganic material to enhance permeability. Upon the addition of water and pasteurization, it is found that the nitrogen content of the composition is substantially maintained and there is a substantial absence of free ammonia. The composting is then inoculated with spawn, incubated, a casing applied to the composting and the fruiting bodies harvested. The procedure for growing the mushrooms is conventional.

DESCRIPTION OF SPECIFIC EMBODIMENTS

A novel composting composition for mushrooms is provided comprising a cold manure, a moss or member of the musci family, particularly sphagnum, a small amount of an inorganic material to provide permeability and water.

There is a recognized distinction between hot and cold manure. Hot manures are those which on composting generate substantial heat. Illustrative of such manures are horse and chicken manure. By contrast, cold manures on composting do not generate large amounts of heat. Cold manures are illustrated by steer manure, cow manure, sheep manure, pig manure and the like. These manures are used in their dried form and may or may not have been previously sterilized.

To the manure is added any of a variety of naturally occurring humic acid containing colloidal material, e.g. mosses, particularly sphagnopsida, individually or in combination. Illustrative mosses include peat moss, oak leaf moss, and the like.

As an alternative to mosses, other naturally occuring colloidal materials may be employed. Illustrative of such material is walnut shavings and leaf mold.

The significant factor in the subject invention is the presence of a sufficient amount of humic acid in a colloidal particle which serves to bind nitrogen, particularly as ammonia or ammonium compounds, during the thermal pasteurization process.

The third material which is added to provide permeability, so as to allow satisfactory aeration of the compost. Conveniently, gypsum is most commonly used.

In addition, minor amounts of nutrients may be added, such as phosphate, nitrogen, saccharides, or trace elements. These materials are not essential, but may find particular application in special situations or with individual mushrooms.

Normally, about one part of the manure will be added to from 0.5 to one part of the moss or its equivalent. To this mixture will then be added about 2 to 10, more usually about 4 to 6 weight percent based on the manure-moss combination of a permeability agent e.g. gypsum.

The dry mixture is mixed with water, in about 50 to 70 weight percent based on the dry mixture, so as to provide a substantially homogeneous mixture. Any convenient means for mixing the various ingredients together may be employed, such as a rotating drum, paddles or the like.

The product is then pasteurized by heating at a temperature of from about 35° to 121° C, more usually from about 85° to 100° C for from about 0.5 to 4.5 hours. To insure the destruction of microorganisms, the higher temperatures are preferred.

It is found that during the pasteurization step, little if any nitrogen is lost, and there is a substantial absence of an ammonia odor, or free ammonia which is quite toxic to the growth of fungi.

The composting composition is now ready to be employed for mushroom growth. By the subject procedure described above, the long arduous and tedious process of composting the hot manures is avoided, while obtaining an excellent substrate for the growth for mushrooms.

It accordance with conventional procedures of growing mushrooms, the composting substrate is now spread into a bed, tray, or plastic bag, usually to a thickness of about 6 to 8 inches.

The composting bed is then inoculated with spawn. Various types of spawn may be used, such as manure spawn, grain spawn and the like. The spawn is introduced into the bed, so as to be covered to a depth by about one to two inches of the composting material.

After the inoculation with spawn, the temperature is maintained at about 20° to 25° C for up to about 3 weeks usually at least 10 days. A casing is then applied which can be soil, moss, or the like. The casing is usually of a thickness of about 1 to 1.5 inches. The mycelia then grown into the casing to provide fruiting bodies. After the casing during the growth of the mycelia and the initiation of fruiting bodies, the temperature is normally maintained at about 18° C plus or minus 2° . Within 2 weeks the fruiting bodies have started to form and a week later may be harvested. After harvesting, the bed is watered and a new crop of mushrooms is normally ready to harvest in about ten days. From about five to six harvests can be obtained before the bed is exhausted.

For home use or harvesting of small crops, a terrarium may be employed, with the compost introduced into the bottom of the terrarium. The terrarium then provides the desired moist environment for the growth of the mushrooms.

In accordance with the subject invention, a novel composting composition is provided for the growth of mushrooms, which avoids the more tedious and arduous techniques which have previously been used. With the subject compost, excellent yields of mushrooms are achieved within relatively short periods of time from the time of inoculation. The mycelia are able to rapidly establish themselves, and growth is achieved in substantially the same manner as was employed for composting obtained by prior art methods.

Although the foregoing invention has been described in some detail by way of illustration and example for purposes of clarity of understanding, it will be obvious that certain changes and modifications may be practiced within the scope of the appended claims.

What is claimed is:

1. A method for growing mushrooms requiring a casing which comprises preparing a growth medium bed comprising pasteurized mixture of a cold manure and a naturally occurring colloidal particle having a significant amount of humic acid, and prepared by combining about 1 part by weight of said cold manure with from about 0.5 to 1 part by weight of said naturally occurring collodial particle matter and from about 50 to 70 weight percent based on the dry mixture of water and pasteurizing said mixture at a temperature from about 35° to 120° C for a period of from about 0.5 to 4 hrs;

inoculating said bed with spawn;
incubating said inoculated mixture for up to three weeks at a temperature of about 20° to 25° C;
applying a casing to said composting bed; and
maintaining said case mixture at a temperature of about 18° +/−2° C to produce fruiting bodies.

2. A method according to claim 1, wherein said bed is a composition having from about 2 to 10 weight percent of calcium sulfate based on said composition.

3. A method according to claim 1, wherein said collodial material is moss.

4. A method according to claim 3, wherein said moss is sphagnum.

5. A method according to claim 1, wherein said pasteurizing is at a temperature of from about 85° to 100° C.

* * * * *